(12) United States Patent
Foxwell

(10) Patent No.: US 6,592,291 B2
(45) Date of Patent: Jul. 15, 2003

(54) BOAT RAMP

(76) Inventor: Robert D. Foxwell, 6549 Harbor Pl., Pror Lake, MN (US) 55372

( * ) Notice: Subject to any disclaimer, the term of this patent is extended or adjusted under 35 U.S.C. 154(b) by 57 days.

(21) Appl. No.: 10/017,846

(22) Filed: Nov. 30, 2001

(65) Prior Publication Data

US 2003/0101920 A1 Jun. 5, 2003

(51) Int. Cl.[7] .................................................. B63C 1/08
(52) U.S. Cl. ............................................. 405/1; 114/44
(58) Field of Search .............................. 114/44–48, 344, 114/361, 230.1; 405/1–7, 218–221; 193/35 R, 37, 35 MD, 35 J, 35 B; 414/534, 678; 280/414.1, 414.2

(56) References Cited

U.S. PATENT DOCUMENTS

| | | | | |
|---|---|---|---|---|
| 2,554,398 A | * | 5/1951 | Brei | 193/42 |
| 2,658,354 A | * | 11/1953 | Lee | 405/1 |
| 2,889,945 A | * | 6/1959 | Holsclaw | 414/534 |
| 3,104,770 A | * | 9/1963 | Calkins et al. | 414/531 |
| 3,146,599 A | | 9/1964 | Young | |
| 3,221,899 A | | 12/1965 | Gronlund | |
| 3,227,292 A | | 1/1966 | Jacobs | |
| 3,587,874 A | | 6/1971 | Graf | |
| 3,693,813 A | * | 9/1972 | Calkins | 414/534 |
| 3,888,367 A | * | 6/1975 | Cox | 414/534 |
| 3,974,924 A | * | 8/1976 | Ullman, Jr. | 414/531 |
| 4,464,092 A | * | 8/1984 | Chambers et al. | 414/534 |
| 4,507,016 A | | 3/1985 | Honour, VII | |
| 4,781,515 A | * | 11/1988 | Johnson | 414/534 |
| 4,997,332 A | * | 3/1991 | Johnson | 414/534 |
| 5,184,913 A | | 2/1993 | Meriwether | |
| 5,255,933 A | * | 10/1993 | Carrick | 280/414.1 |
| 5,400,733 A | | 3/1995 | Richter | |
| 5,449,247 A | | 9/1995 | Smith | |
| 6,092,961 A | * | 7/2000 | Kilgore | 405/7 |
| 6,182,597 B1 | | 2/2001 | Maxwell et al. | |
| 6,520,728 B1 | * | 2/2003 | Schwitters | 414/467 |

* cited by examiner

Primary Examiner—S. Joseph Morano
Assistant Examiner—Ajay Vasudeva
(74) Attorney, Agent, or Firm—R. C. Baker & Associates, Ltd.

(57) ABSTRACT

The new boat ramp has a ladder-style frame having C-shaped elongated lateral side rails held in spaced apart parallel condition by C-shaped cross support beams. One end of the frame is a water end and the other end is a shore end. At least six hull roller assemblies are mounted on the side rails in laterally paired relationship across from each other and in longitudinally spaced relationship. One lateral pair is at the water end. Each assembly has a roller axle carrying a hull roller at each end. The assemblies are mounted so that their axles are in pivotable elevated transverse orientation above the side rails so as to provide hull conforming support for a boat. A keel assembly having a central keel roller of significant axial length in at the water end. The hull rollers of the hull roller assemblies at the water end and the keel roller are all located in such proximity to each other as to substantially preclude all contact by the bow of a boat against structural elements of the ramp at the water end other than the hull rollers and the keel roller. At the shore end is a braced winch assembly for loading boats onto the ramp. The components of the ramp are styled to permit parcel shipment to any location of all components in unassembled condition. Further, the components are easily assembled using well-known and widely used household tools.

10 Claims, 9 Drawing Sheets

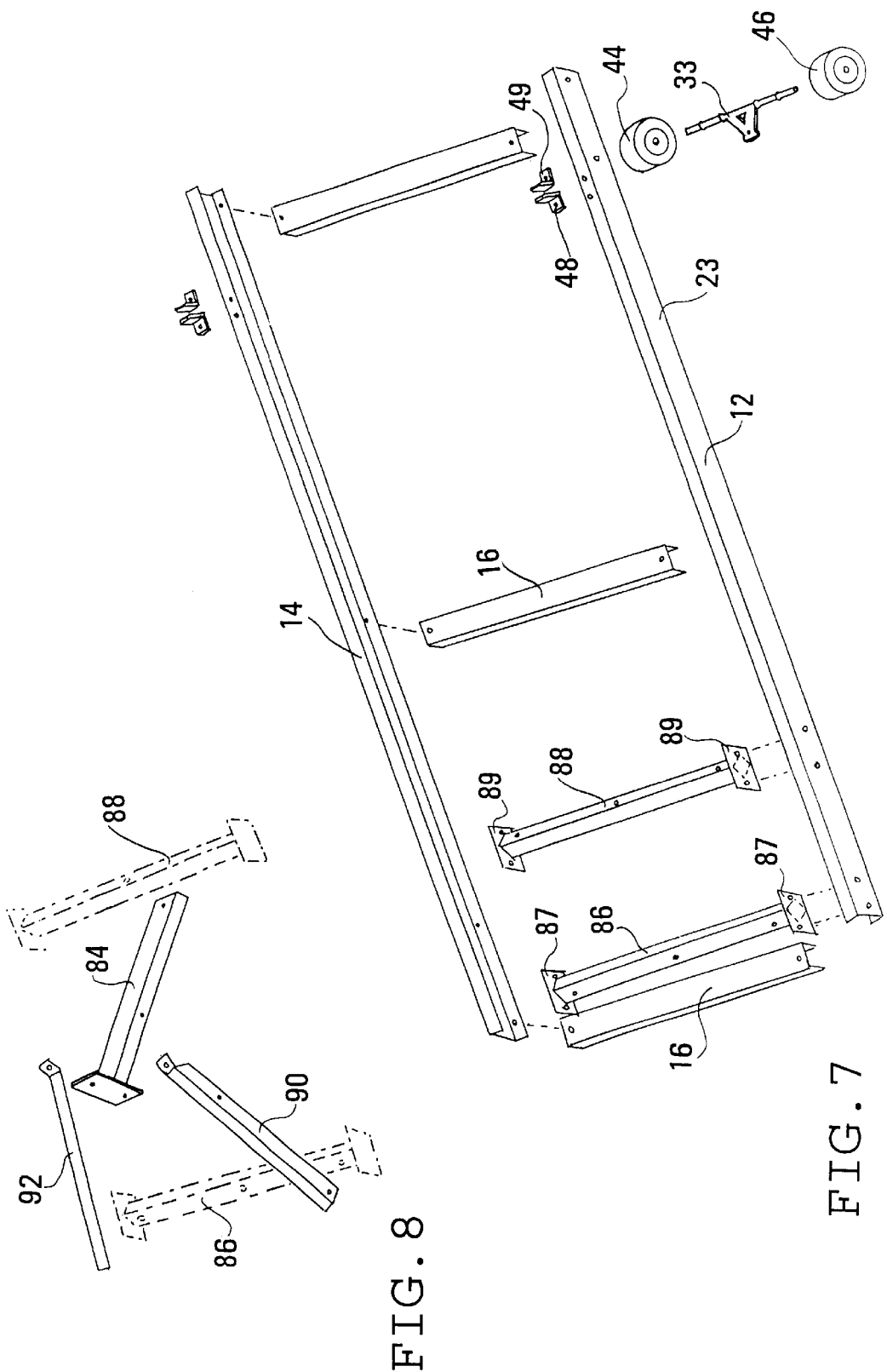

BOAT RAMP

This invention relates to a boat ramp, and more particularly to a boat ramp of the type for docking or mooring a boat temporarily out of the water and permitting quick launching of the boat back into the water with great ease.

The invention is useful for boats having a length not in excess of about 25 feet and is most useful for boats of shorter length such as about 8, 12, 16, or even 20 feet.

BACKGROUND OF THE INVENTION

The art of boat ramp design has received an enormous amount of attention over the years, with the result that a multitude of options for boat ramp design have been created. In short, this field of technology is extremely highly developed.

Unfortunately, however, despite its highly developed nature, it appears that little or no serious attention has heretofore been given to a ramp design using a keel roller of long axial length in combination with hull support rollers to preclude or at least substantially minimize the risk of unsightly scratches or other damage to a boat during ramp use. There appears to have been great emphasis heretofore on nice little keel rollers, and especially a plurality of aligned little keel support rollers, with concomitant reduction of the number of lateral hull support rollers to one or two and the consequent relatively higher risk for bow and keel damage as well as for poor balance of a boat on such a ramp.

Everyone heretofore seems to have liked a winch for pulling a boat out of the water onto a ramp, but when it comes to ladder-style ramps, little attention seems to have been given to simplified but effective bracing for the winch assembly.

Some ramps heretofore proposed have had articulated sections; others have had the entire ramp structure mounted for pivot operation. Such expedients create balancing issues and generally require a fair amount of energy for successful operation. Any excessive expenditure of energy is looked upon by most boat enthusiasts as less than ideal.

Much to be desired has been a boat ramp of exceedingly simple design, a design calculated to minimize the risk of scratching and other damage to a boat, a design with good hull support to maintain boat stability during ramp storage, and a design with operational features contributing to ease of boat storage as well as fast and easy launching capability. This invention is directed toward those goals. Further, in its most preferred form, the invention additionally provides a ramp design permitting the unassembled components to be conveniently and compactly packaged for shipment as parcel packages to almost any location desired without exorbitant shipping expense. This becomes especially noteworthy when it is recognized that boat ramps normally have only enjoyed relatively local area markets as distinguished from national market penetration. It also is especially noteworthy when combined with the fact that the components of the preferred new boat ramp of this invention can be easily and conveniently assembled using readily available and widely used tools.

SUMMARY OF THE INVENTION

The new boat ramp of the invention has a ladder-style metal frame. Such a frame has elongated lateral side rails held in spaced apart parallel condition by cross support beams. Ideally, the rails and the cross support beams are made using extruded aluminum lengths having a C shape in cross-section. The spaced apart condition for the rails should be greater than about one and one-half feet, and the rails should have a length greater than 10 feet and terminate at one end as a water end and terminate at the other end as a shore end.

The ramp has at least six hull roller assemblies so as to provide at least three on each rail. Preferably a greater number of hull roller assemblies are employed, such as five or six on each rail, up to as many as eight or 10 or even 12 or more on each rail. The hull roller assemblies are laterally paired on the side rails (e.g., the hull roller assembly on one side rail is paired to the hull roller assembly across from it on the other side rail). Also, the paired hull roller assemblies are longitudinally spaced from each other along the rails. It is important to have plural hull roller assemblies distributed over at least the water end half of the length of each of the rails.

Hull roller assemblies of the invention have a hull roller axle on which is mounted at each end a hull roller. Thus, each assembly has two hull rollers as part in its makeup. The hull roller assemblies on the rails are so arranged and mounted that their axles are in pivotable, elevated, transverse orientation above the rails. This permits the hull rollers to pivot and rotate according to the contour of the hull of a boat being pulled into resting condition on them. At least one hull roller assembly is at the water end terminus of each rail, and this particular hull roller assembly generally should employ a slightly shorter axle length (for hull rollers) than the hull roller assemblies otherwise distributed in spaced relationship on a rail. The shorter axle contributes to total strength for the assembly at the water end where the weight on it (contributed in part by the boat motor) is likely to be the greatest. It also contributes to closer spacing between hull rollers on the axle and protects against penetration of the bow of a boat between the hull rollers and thus saves it from damage. The hull rollers nearest each other on the paired assemblies across from each other are called inside hull rollers, whereas those hull rollers that are furthest from each other on the paired assemblies are called outside hull rollers.

At the water end is mounted a keel roller assembly equipped with a central keel roller. The keel roller preferably is greater in axial length than one-fourth of the distance between the rails. The axial length of the keel roller should be at least about 6 inches and ideally is at least about 10 inches. It can be greater in length. The inside hull rollers of the paired hull roller assemblies at the water end have a proximity relationship to the keel roller so as to cooperate with the keel roller to substantially preclude all contact by the bow of a boat against structural elements or components of the ramp at the water end other than the hull rollers and the keel roller.

The low profile of the entire ramp—and particularly the low profile for the water end keel roller and other elements—permits convenient boat loading on the ramp even when only a minimal ramp length extends into the water.

A winch assembly is mounted on the ramp at the shore end of the ladder-style frame. The mounting employed is preferably such as to orient the winch mount beam at an angle. It is mounted at a foundation location spaced inward from the shore end and extends toward the shore end at a low upward angle of no more than about 45 degrees from the rails. The length of the winch mount beam and the bracing relationships for it are preferably such as to place the winch end of the beam approximately perpendicularly upward at the shore end, and at a modest but useful elevation above the shore end—a position that allows for maximum utilization of the ladder system to receive boats.

Components of the new boat ramp are ideally formed for easy assembly. Simple well-known small hardware (e.g., bolts, nuts, cotter pins, washers) is used to fasten and hold components in assembled condition. The components and the simple hardware are capable of being packaged in a manner satisfying limitations imposed by well-known and popular parcel shipment services such as United Parcel Service and others. Parcel shipment services generally limit the size of packages acceptable to them (as by weight, length, and girth) so that the packages can be handled by a single individual or at least stand a good chance of being handleable by a single individual. Among other things, packages greater than 9 feet in length are generally not acceptable, yet the rails of the ladder-style frame of the new ramp easily exceed a length of 9 feet or 108 inches. To accommodate shipment limitations, rails of the new ramp are conveniently made in sections for shipment, and joined together by connector brackets to achieve lengths as desired for ramp use. An ideal illustration is that of using rail sections having a length of about 103 inches and uniting two or more of such rail sections with connector brackets to achieve the desired length for a ramp. From a practical standpoint, two such sections can form a ramp length of 206 inches. Such a length can accommodate a majority of the smaller inlandlake boats, and three such sections forming a ramp length of 309 inches is believed to satisfy most of the remaining market for practical inlandlake boat ramps.

Many other benefits and advantageous features and characteristics of the invention will become evident as this description proceeds.

DESCRIPTION OF THE DRAWINGS

FIG. 7 is a schematic perspective exploded view of several of the components for the shore end rail section of the ramp;

FIG. 8 is a schematic perspective exploded view of the winch mount system at the shore end and includes some parts shown in phantom (parts in phantom are duplicates of parts shown in FIG. 7);

DESCRIPTION OF THE PREFERRED EMBODIMENT

Figure 1:
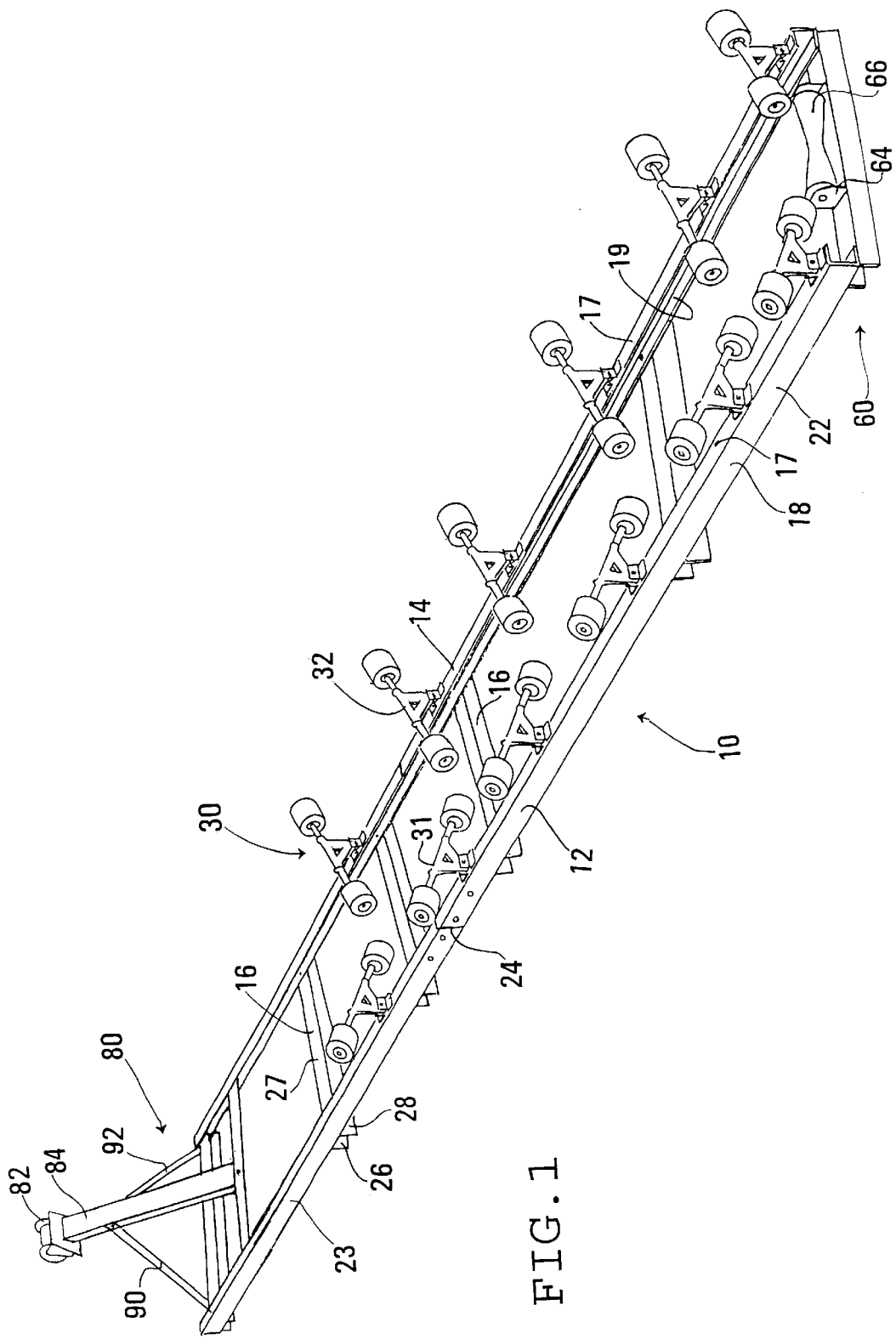
FIG. 1 is a schematic perspective view of a boat ramp of the invention in assembled condition; the view looks up at the ramp from the water end toward the shore end where the winch is located.

For clarity in understanding the components as they are presented in different views of the drawing and discussed in the text, an effort will be made to use the same number for a component wherever it is shown in the drawings and wherever it may appear in text. In this connection, please note the components displayed in FIG. 6 et seq. The numbering in those figures is the same as for the component in assembled condition in the earlier figures.

Referring first to FIG. 1 (and note also FIGS. 2–8 for added detail), the new boat ramp has a ladder-style frame 10, a plurality of hull roller assemblies 30, a water end keel roller assembly 60, and a shore end winch assembly 80—all formed of components easily assembled together using non-sophisticated tools and simple small fastening or holding hardware such as, for example, bolts, nuts, cotter pins, and washers. A customer-user can assemble the components without need for welding, soldering, rivoting, etc.

The ladder-style frame has a pair of elongated lateral side rails 12, 14 held in spaced apart parallel condition by cross support beams 16. The spaced apart condition for these parallel rails should be greater than about one and one-half feet, and generally will not exceed about 3 feet. The measurements for this spacing may be taken from the center line of each rail. It should be added, however, that such precision for measurement is not critical. The spacing of the parallel rails is approximate (not exact) but should be enough for excellent stability of hull support by the hull roller assemblies 30 on opposite sides of the ramp. Excessive spacing of the side rails beyond that recommended introduces problems of proper boat hull support. Furthermore, it would add needlessly to the length and size and bulk and weight of components such as the cross beams 16.

The ideal lateral side rails 12, 14 are made of aluminum and have a cross-sectional C shape. The C shape is formed by a unifying side web or wall 18 that connects upper or top flange 17 and lower or bottom flange 19 of the C shape (see FIGS. 1 and 4). The ideal arrangement of these C-shaped rails is that of placing the cavity 20 of each lateral side rail 12, 14 in a facing relationship toward the opposite side rail. This is done for strength purposes as well as for convenient mounting of the spacing and bracing cross support beams 16 easily to the bottom flange 19 of the C-shaped rails, and for convenient mounting of the hull roller assemblies 30 to the top flange 17 of the C shape. The arrangement (with the cross support beams mounted to the lower or bottom flange 19 and the hull roller assemblies at a location above the top flange 17) achieves not only appropriate rigidity for the ladder-style frame itself but also easily achieves adequate elevation needed for hull rollers in order to avoid keel damage.

The lateral side rails 12, 14 should have a length greater than 10 feet. That length may be as great as 30 or even 40 feet. The length depends upon the boat to be accommodated on the ramp, and how far a user wants the boat to be moved up from the water. Ideally, a basic ramp accommodating most of the smaller boats can be formed by connecting two approximately 9-foot sections of rail material linearly together to form a composite length of side rail. Thus, with reference to FIGS. 1, 6, and 7 as an illustration, a water end rail section 22 of a composite side rail may be connected to a shore end rail section 23 by a metal connector bracket 25 at the abutment 24 of the connected ends of those two sections. The connector bracket 25 is not clearly shown in FIG. 1, but is quite well shown in FIG. 6. It is illustrated as a short length (about 2 feet) of C-shaped material capable of forming a flush fit inside the cavity 20 of the C-shaped rail sections 22 and 23. Bolts are used to fasten the connector 25 rigidly to the abutting ends of rails 22 and 23. Holes 26 in the rail sections as viewed in FIGS. 6 and 7 and holes 27 in the view of connector 25 in FIG. 6 accommodate the bolts to fasten connector 25 in position. To be especially observed is that the connected ends of the two rail sections 22, 23 literally abut and are connected by the connector bracket 25 in a firm manner that prevents pivoting or other articulation for the connection.

The cross support beams 16 are suitably made from extruded stock of the same type (e.g., aluminum metal) as employed for the lateral side rails. While extensive cross bracing using cross support beams 16 may be employed to hold the parallel rails in fixed, spaced apart relationship, quite adequate spacing between the rails can be realized by employing a cross support beam 16 at or near each end of an approximately 9 foot (or slightly shorter) rail section and one in the middle of it. Bracing by using cross support beams 16 at the land end identified as the shore end as well as at the water end of a rail is important, or at least quite desirable, for strength purposes. The ends of rail sections joined by the connector bracket 25 preferably are braced with cross support beams 16 at a location slightly spaced inward from the joined end, and thus just inward from each side of the connector bracket, but nevertheless near the connector bracket, so as to achieve desired strength at that location. Between those two extremes a further cross support brace or beam 16 is desirable. More may be employed, but more are normally not critically necessary. Bolt fastening (e.g., nuts and bolts) of the cross support beams on the underside of the bottom flange of side rails is ideal, using preformed holes in the parts. As illustrated in FIG. 1 and suggested in FIGS. 4, 6, and 7, the cross support beams 16 are oriented so that their flanges 26, 28 on each side of their web wall 27 are directed perpendicularly downward and the web wall 27 of the beams is flush against the lower flange 19 of the side rails. This permits the components to be easily assembled and disassembled.

Mounted to the upper flanges 17 of the C-shaped side rails are a plurality of hull roller assemblies 30. They are preferably in laterally paired relationships. Thus, one hull roller assembly such as that numbered 31 in FIG. 1 is directly across from its paired hull roller assembly 32 on the other rail. They are transversely across from each other. The pairs are longitudinally spaced along the rails. The number of pairs along the rails can vary, but at least three (a total of at least six)—and preferably at least five for a total of at least 10—are longitudinally spaced along each side rail, especially on the section of the total rail length having the water end terminus. They may be distributed at about equal longitudinal spacing over the entire water end half (or even over the water end three-fourths) of the length of each side rail. For a strong boat support at the water end of the rails (where the stern and motor of a boat usually will rest) it is highly desirable to combine paired hull roller assemblies at the very terminus of the side rails with an additional pair in close proximity to the terminal pair (see FIG. 3). A suitable proximity is about one foot (e.g., about 9 to 15 inches). The spacing between other pairs of hull roller assemblies can be about 2 feet (or even 3 feet if desired). Rarely will more than 16 hull roller assemblies per side rail be needed, even for exceedingly long ramps.

Figure 2:
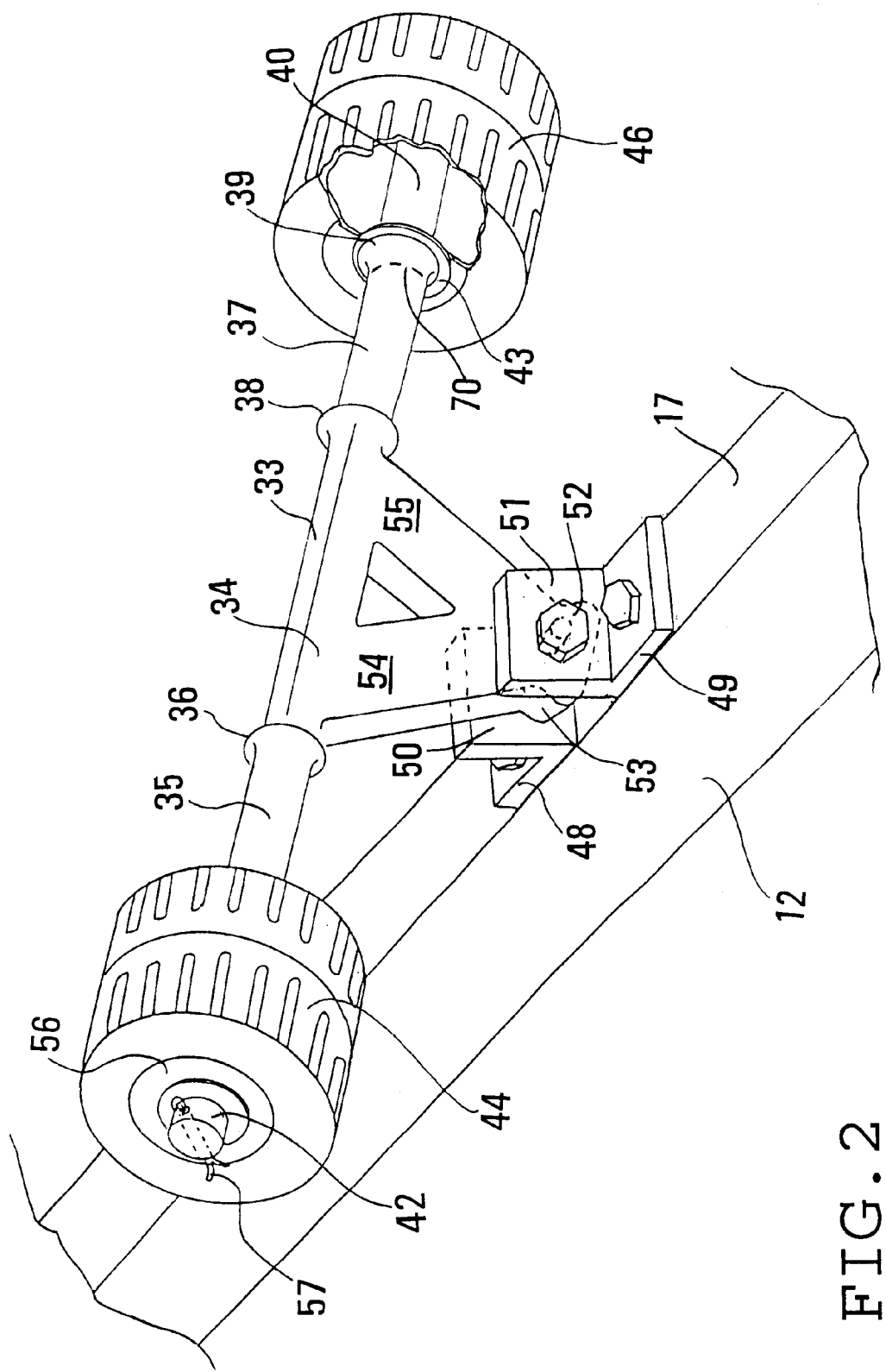
FIG. 2 is a schematic perspective view of an illustrative hull roller assembly, with parts broken away; the assembly has an elevated pivotable axle above the ramp side rail; the axle extends in a direction transverse to the side rail and there is a hull roller at each end of the axle.

Reference is made to FIG. 2 for the preferred components and structural features for a hull roller assembly 30. The assembly 30 has a composite pivotable hull roller axle 33 (i.e., the central axle part 33 connects the hull roller axle parts 35, 37, 40, and 42 and is the convenient identifier part for the axles as a whole). At each end of the axle (i.e., composite axle) for the hull roller assembly is a hull roller 44 and 46, preferably of the wobble roller type. Wobble rollers are well known and literally have the capability of wobbling and thus the capability of slightly adjusting the angularity or pivot of their axis of rotation with respect to the axis of the axle about which they rotate. Their ability to so adjust facilitates their ability to present the widest exterior tread surface or circumferential surface as a support for a boat hull contacted by the hull rollers.

An important characteristic of the hull roller axle 33 and the hull rollers 44, 46 at each end is that of elevation. The composite axle (including parts numbered 34 through 42) should be mounted for pivot, and this means that the entire axle and its hull rollers 44 and 46 at each end should be mounted for pivot action. (That pivot action might be slightly different for the hull roller on one end versus the hull roller on the opposite end of an axle, but the important point is the function of pivot to achieve good hull contact by the rollers.) Additionally, the mounting of the axle and hull rollers should be elevated above the side rails (about 3 to 12 inches) so as to avoid keel damage. In short, the axle as well as the hull rollers carried on each end of it should be mounted in relatively elevated and pivotable transverse orientation above the rails. The mounting must permit the assembly to pivot and the roller to rotate in conformance to the contour of the hull of a boat pulled into resting condition upon the rollers. Each hull roller assembly 30 is mounted on the upper or top flange 17 of a side rail by a suitable bracket or brackets 48 and 49. The bracket is fixed to a side rail such as the rail 12, and the elevation of a hull roller axle can be accomplished by a brace system extending between the axle 33 and the ear flange or ear flanges 50, 51 of bracket mounting. The pivot mounting 52 for the axle may be a bolt mounted on a bracket or between two parts or ears 50, 51 of a bracket as illustrated. The illustrated pivot for the axle is at a very low location near the top flange 17 of a side rail such as rail 12, and the elevation for the axle is accomplished by any suitable bracing 54, 55 extending upward to the composite axle 33. (Of course, the elevational bracing may be integral with the bracket attachment to a side rail, if desired.)

The illustrated approach—having the pivot 52 positioned just above a side rail and having the axle elevation built into or accomplished by the body of a brace 54, 55 extending up to hold the axle (and even merging into the axle)—has the merit of improving strength for the axle 33.

The length of the axle 33 for the hull roller assemblies at the water end terminus of the side rails can be (and preferably is) slightly shorter than the length of the axle for the other hull roller assemblies (including the adjacent assemblies spaced about one foot away). The difference between the axle length for the water end hull roller assemblies and the axle length for all other hull roller assemblies can, of course, be satisfied by special casting for the shore end assembly as distinguished from the other hull roller assemblies. But it is useful to employ a single mold for casts that can be made to satisfy the preferred axle requirements for all hull roller assemblies. In FIG. 2, the illustrated axle is made up of several axle sections, namely a central frame section 34 bounded at each end by inner annular stop ridges 36 and 38, then inner axle lengths 35 and 37 which extend out to outer annular stop ridges at each end (only one such outer ridge 39 is shown in FIG. 2), and finally axle lengths 40 and 42 terminating at the outermost ends of the composite axle. The outermost axle lengths 40 and 42 are useful for mounting widely spaced hull rollers 44 and 46 thereupon, whereas the inner axle lengths 35 and 37 are useful for the preferred water end hull roller assemblies 58 and 59 (see FIGS. 4 and 5). The composite axle of long length (including end axle lengths 40 and 42) suitably can be between about 12 and about 16 inches, with about 14 inches preferred, whereas the short composite axle length (excluding the end axle lengths) should be within the range of about 7 inches to 10 inches, with about 8 or 9 inches preferred. A curved dash line 70 in FIG. 2 (just inside annular ridge 39) illustrates where an axle casting for the design should be cut after casting or be blocked off in the casting form prior to casting so as to form the shorter axle length (without outer annular stop ridges as well as without the outermost axle length at both ends of the composite axle).

Mounting of a hull roller at an end of the axle is accomplished in any suitable manner. A "floating" abutment such as a washer 43 may first be placed on the axle against an annular ridge. Then the hull roller is put on the axle and finally a terminal washer 56 and a holding cotter pin such as at 57. A hole is suitably drilled in the axle for the cotter pin. Other styles of mounting for the hull rollers on an axle may be employed, but the outlined approach is simple and effective. Regardless of details of structure, the axles are mounted in pivotable, elevated, transverse orientation above the rails. The terminus of each side rail at the water end is equipped with a hull roller assembly 58 and 59 (see FIGS. 3 and 4), and the hull rollers nearest each other at the water end are called inside hull rollers 61 and 62. For the purpose of maintaining the axles of the hull roller assemblies at a desired tilt orientation for ready receipt of a contoured hull of a boat, a stop or pivot limiting bulge or body or knob 53 (see FIG. 2) may be incorporated on the pivot structure near its axis of pivot. The dominant pivot limit or stop in terms of mass should be on the outside of the pivotable structure. If desired, a stop or pivot limit may be incorporated on the inside of the pivot structure. The term "inside" refers to parts across from each other but nearest each other in a paired relationship on the rails 12 and 14, whereas the term "outside" refers to those parts or hull rollers that are the furthest apart in the paired relationship of the hull roller assemblies.

Figure 3:
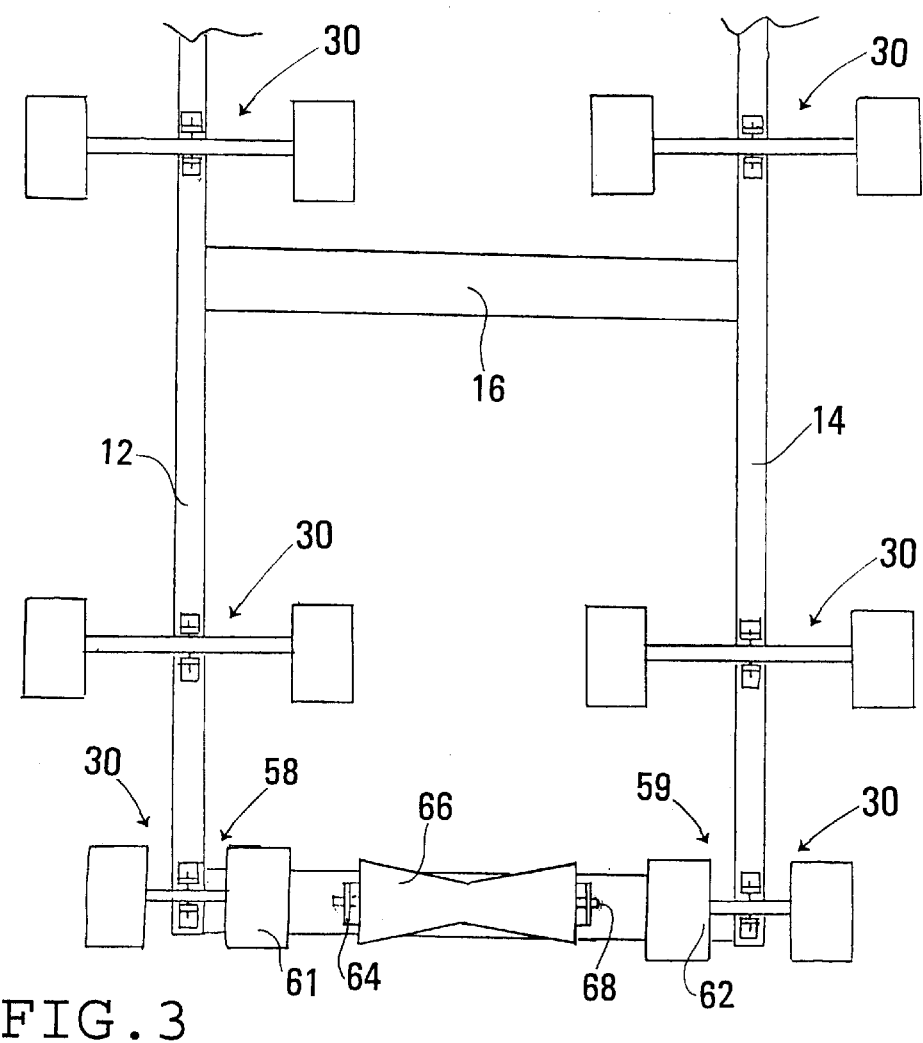
FIG. 3 is a schematic top plan view of the water end of the ramp.
Figure 4:
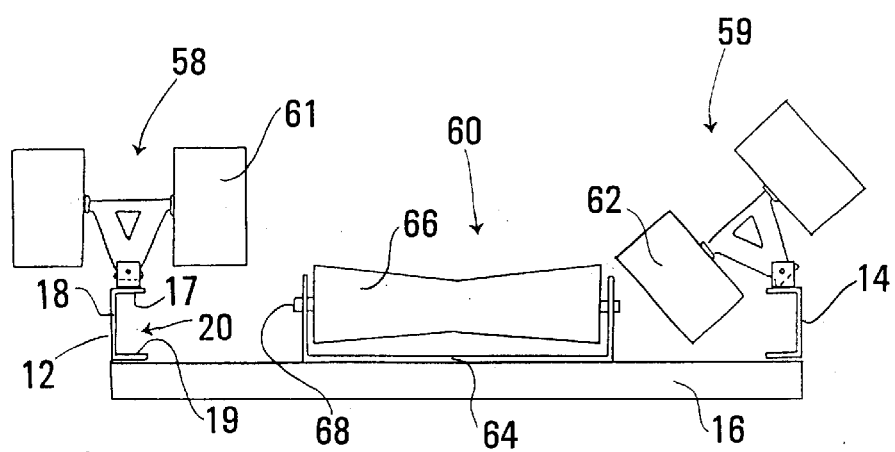
FIG. 4 is an schematic end elevational view of the water end of the ramp.

See FIGS. 3 and 4 for the water end terminus carrying the keel assembly. A cross support beam such as 16 is at the water end terminus of the rails, as previously mentioned. This particular water end cross support beam can be considered to be part of the total keel assembly. It may have a keel roller bracket 64 permanently fixed to it as by welding, if desired. (The option exists for using a separate keel roller bracket and bolting it to the water end cross support beam.) The keel bracket 64 is on a water end cross support beam at a location midway between the lateral side rails 12, 14 and accommodates a keel axle 68 carrying a keel roller 66 having a substantial axial length. (Any suitable holder or fastener such as a nut or cotter pin, etc. may be used to hold the keel axle in the upstanding end ears or flanges of the bracket 64.) The axial length of the keel roller is at least 6 inches and preferably is at least 10 inches, and is always at least greater than one-fourth the distance between the side rails 12 and 14. Further, the diameter of the axial ends of the keel roller is so great (e.g., about 3 or 4 or 5 inches) that the keel roller at its axial ends extends radially outward from the upstanding end ears or flanges of the bracket. Thus, the keel roller obstructs contact with the upstanding flanges of the metal bracket by the bow of a boat as the boat is loaded onto the ramp.

Further, the keel roller assembly is essentially in alignment across the water end terminus with the hull roller assemblies that are laterally outward at the water end. (Optionally, the hull roller assemblies at the water end might be slightly displaced from true alignment from the keel roller and occupy a position slightly spaced back from the water end terminus; but the ideal arrangement places all of these rollers in alignment very close to the water end terminus.) The significantly large axial length for the keel roller and the relatively elevated relationship of the hull rollers and their relatively close relationships on the hull roller axle, plus their close relationship to the axial ends of the keel roller, present a total arrangement at the keel end that is highly protective of the bow of a boat at the beginning stages of loading the boat on the ramp. In this regard, many keel rollers have a relatively deep central annular groove for acceptance of a keel, whereas the keel roller of this invention is not dependent on a deep annular groove since it primarily functions as a bumper protector to save on damage to the keel and additionally functions to some degree as a centering roller for the keel.

It is to be understood that the keel roller, as well as the hull rollers, are ideally made of non-scratching elastomeric material (natural or synthetic, including plastic types), whereas the other elements and components of structure are ideally made of metal, especially aluminum (although strong and durable plastics such as polyamides may be substituted for some metal components, if desired). The strength and rigidity of C-shaped metal permits some reduction of weight or bulk while maintaining structural integrity, and is especially important for the ladder-style frame. The fundamental arrangement at the water end is that of a keel roller in cooperative relationship with the water end terminal hull rollers so as to substantially preclude all contact by the bow of a boat against structural elements at the water end except the keel roller and hull rollers.

Figure 5:
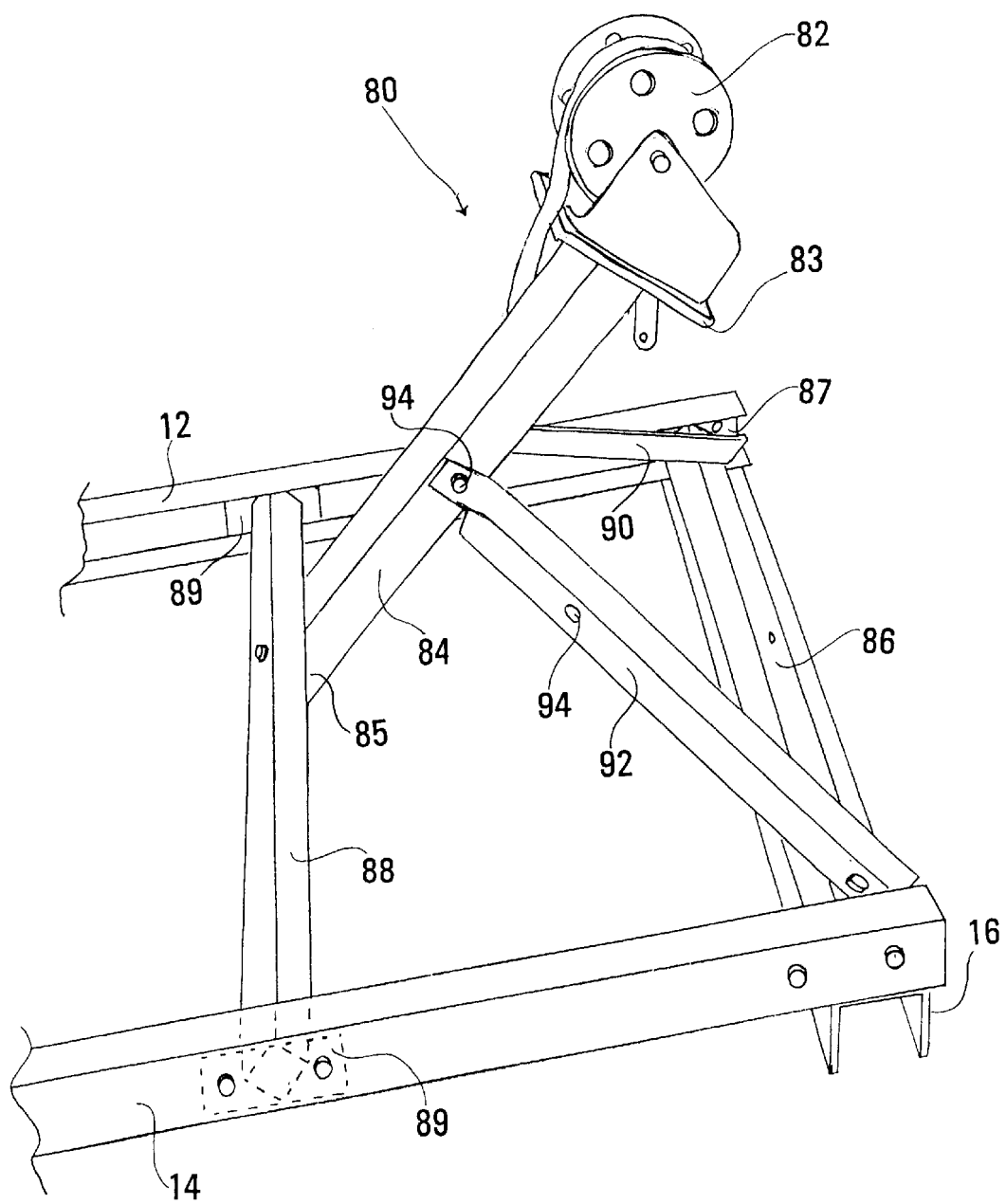
FIG. 5 is an enlarged schematic perspective view of the shore end of the ramp where the winch assembly is located.

Referring now to FIG. 5, the shore end has a winch assembly 80 specially braced to resist buckling. The winch 82 itself is on a plate or comparable structure 83 fixed at the winch mount end of a sloped winch mount beam 84. The arrangement places the winch approximately between the shore end terminus of the side rails 12 and 14 and above the level of the rails at the shore end.

Bracing is significant, and the ideal bracing requires simplicity of elements to permit ease of assembly using well-known tools. A winch support cross brace 86 extends between the rails at the shore end terminus. This cross brace might be satisfied by some form of cross support beam for spacing the side rails, but it is preferable to employ the special cross brace as illustrated (see FIGS. 5 and 7)—and in addition include a cross support beam 16 at the shore end.

The cross brace 86 has an essentially diamond (e.g., square) cross-sectional shape with a transverse mounting plate 87 at each end for affixing the winch support cross brace 86 to the inside surface of the web backbone of the side rails. The transverse mounting plates 87 extend into the cavity of the side rails and are bolted to the backbone web wall 18 of the side rails so that the diamond cross-sectional shape has its corners pointing in the four compass directions.

Another such winch support cross brace 88 with a transverse mounting plate 89 at each end is mounted between the rails at a location inward from the shore end terminus of the rails. The distance of inward location from the shore end terminus winch support cross brace 86 should be sufficient for flush mounting of the sloped winch mount beam 84 at its foundation end 85 against a sloped side surface of the inwardly spaced winch support cross brace 88. The winch mount beam 84 is suitably formed of aluminum and has a basic web wall backbone with an edge flange along each side. It is the web wall backbone that is mounted (as by bolts and nuts) in flush condition against the lower shore-side sloped surface of the winch support cross brace 88. As used here, the term "shore side" means the side toward the shore end terminus of the rails. The mounting causes the winch mount beam 84 to extend angularly upward from and toward the shore end terminus. The angularly upward direction is about 45 degrees from the longitudinal direction of the side rails, and should be no greater than 45 degrees. If the angle is decreased below 45 degrees, the winch mount beam 84 should be increased in length so as to maintain a comfortable height for winch operation without pulling of the bow of a boat excessively in either an upward or downward direction during loading. Lateral bracing for the winch mount beam includes a lateral brace 90, 92 extending at an angle from each side of a midpoint 94 between the ends of the winch mount beam 84 to a location on the ramp proximate to the shore end terminus of the rails. The preferred location for the lateral braces at their ends spread toward the shore end of the rails is on the winch support cross brace 86 located at the shore end terminus. The relationship between the length of the winch mount beam 84 and the distance of the inwardly spaced cross beam 88 from the shore end terminus of the rails is such as to place the winch approximately perpendicularly upward from the shore end terminus of the rails.

The winch mount beam 84 carries the bulk of the forces encountered during winch operation to load a boat on the ramp. When heavy boats are pulled onto the ramp (or when the ramp is oriented to have a significant upward slope), it may be desirable to put one's foot on the cross bracing at the shore terminal end to assist against any tendency for the shore end to rise up during winch operation, or the shore end may be otherwise anchored, as desired. For example, a ground brace having a helical anchor end may be screwed into the ground and the shore end tied to the same. A hole 94 in the winch assembly can receive an eye bolt to accept linkage to a ground anchor.

Figure 6:
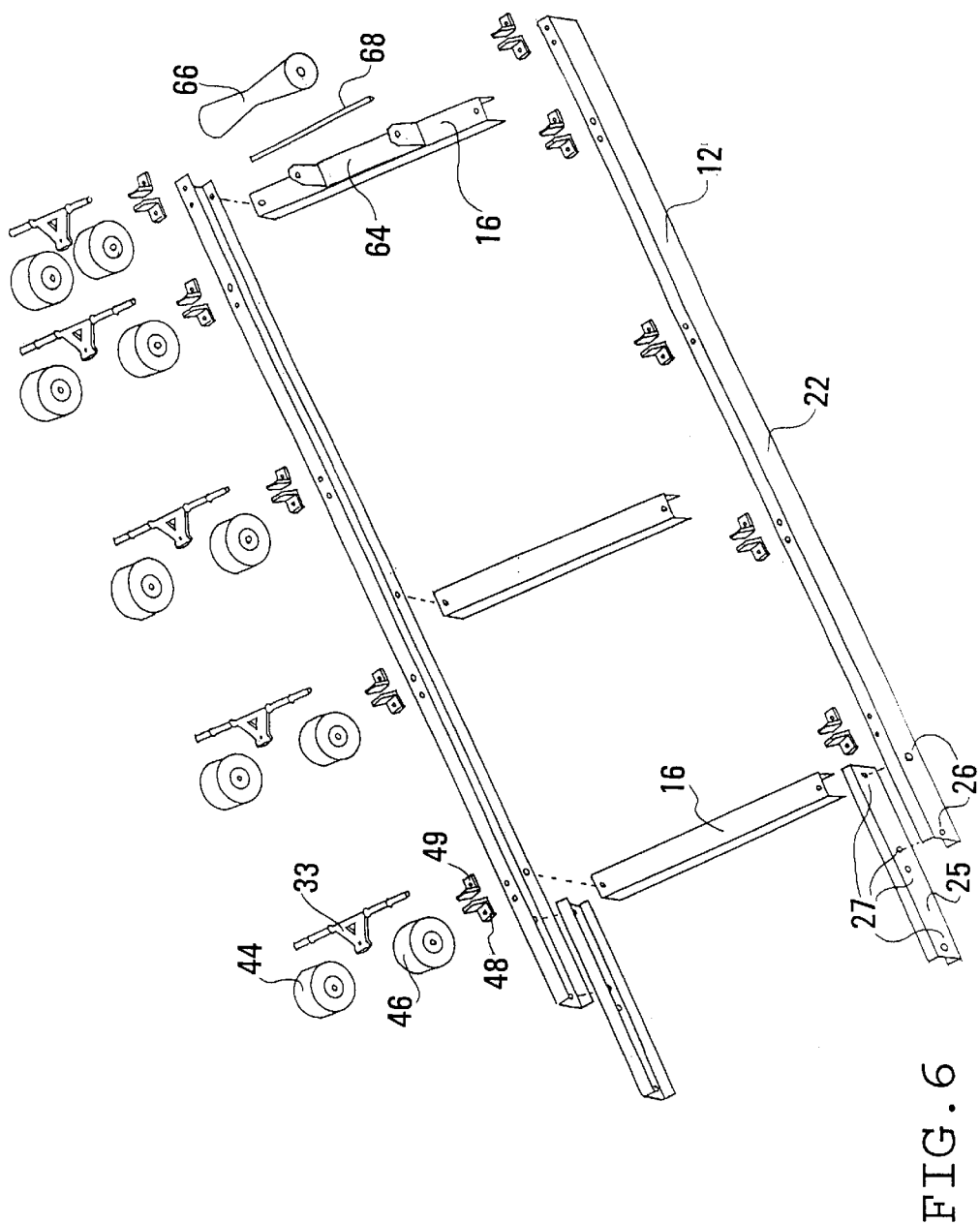
FIG. 6 is a schematic perspective exploded view of illustrative components of the ramp at the water end and includes the laterally spaced two rail sections that terminate at the water end as well as the connector brackets for connecting the water end rail sections to further rail sections such as those of the shore end that carry the winch at the shore end.

Of major significance is the extraordinary simplicity of the components and the ease of their assembly to form the new ramp, and this is especially illustrated in FIGS. 6, 7, and 8, where the numbering for the unassembled components is the same as for them in assembled condition. Only an illustrative number of repetitively used components are shown in the FIGS. 6, 7, and 8; and they are shown in unassembled condition to emphasize their simple nature and the ease with which they may be assembled. Note also that small fastening and holding hardware (all having a maximum dimension below six inches or so) is not shown in the disassembled arrays. Such small hardware ideally consists of bolts, nuts (especially preferred are nuts of the "Nylock" brand), washers, and cotter pins. The components for the ramp are equipped with holes at appropriate locations for bolt and nut fastening of the components together. To reduce the number of different components needed for inventory, it is desirable to make left and right components with an identical pattern of holes so that they can be used interchangeably (even though some holes may be unnecessary for a particular location of use). Similarly it is advantageous to use like extrusion material for different components. For example, the same extruded material in terms of cross-sectional size and channel style may be used for the rails as well as cross support beams and also for the winch mount beam. A useful cross-section for these components has a web wall of about 3 inches on its exterior side and flanges about 1.5 inches on their outside surfaces.

Figure 9:
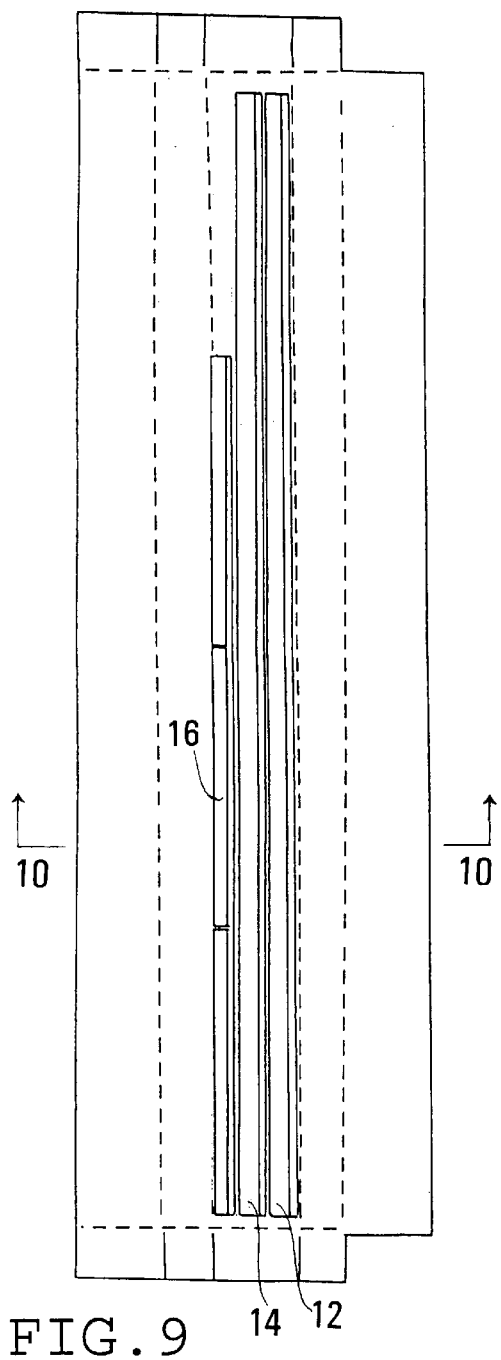
FIG. 9 is a schematic plan view of four compacted rails and six cross support beams in unassembled condition on an opened corrugated shipment box for the same.
Figure 10:
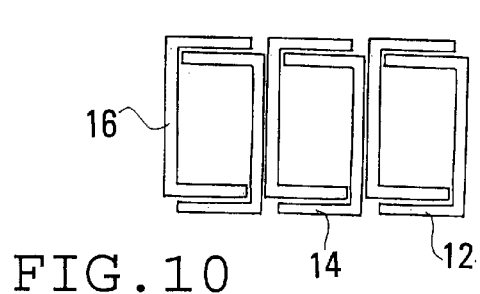
FIG. 10 is a schematic cross-sectional view on line 10—10 of the compacted ramp components illustrated in FIG. 9, showing the intermeshed relationships of the rails and cross support beams for packaging.

Packaging within the limits of weight, length, and girth for parcel shipment by well-known parcel shipping organizations is made possible by the simplified components and the ease with which they may be interrelated to each other for compact packaging. Parcel shipment organizations such as the United States Postal Service, United Parcel Service, Federal Express (FEDEX), and others generally specify a maximum weight of 70 pounds per package. They also specify 108 inches (9 feet) as the maximum length for a package and 130 inches total as the maximum for the length and girth combined. To make up the needed length for the elongated side rails of the ladder-style frame of the invention, each side rail has to be formed of at least two sections. Four elongated rail sections, each 103 inches in length, can make a ladder-style ramp length of 206 inches, and that is long enough for many boats. Four such rails and up to six cross support beams total about 50 pounds and can be compactly placed in a single package by putting the C shape for the rails (and also the cross support beams) with their cavities facing each other and then overlapping the flanges as the rail sections are moved toward each other. By slipping the flanges together in overlapped condition, all four rail sections and also six cross support beams can be placed in a shipping carton well within the limits of length and girth acceptable to parcel shippers. This is illustrated in FIGS. 9 and 10.

Figure 11:
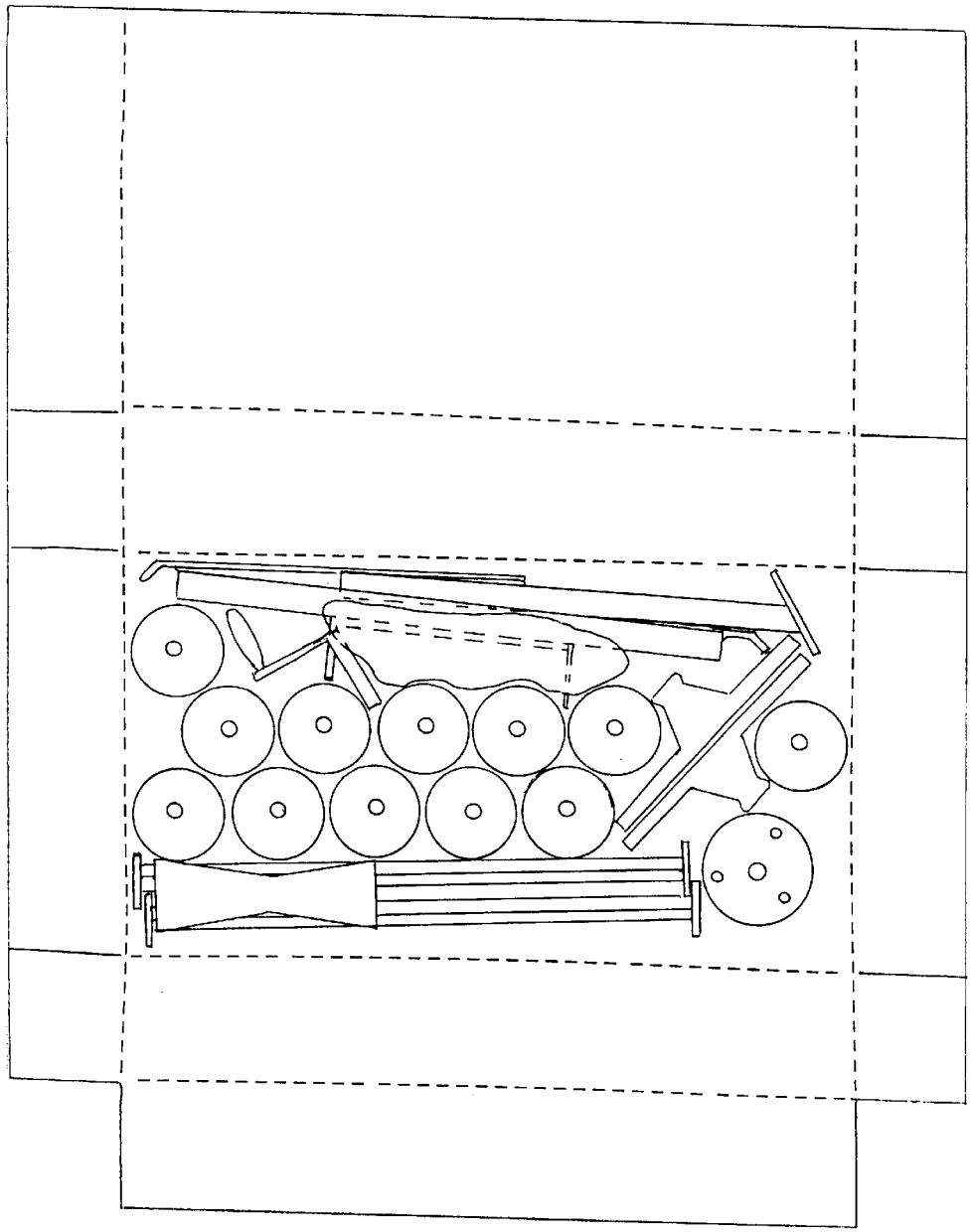
FIG. 11 is a schematic top plan view of ramp components (other than rails and cross support beams) in an open corrugated shipment box.

All remaining components (e.g., 12 hull roller axles with elevational braces, 24 hull rollers, 12 mounting bracket parts for hull roller axles, a keel bracket with or without a cross support beam, keel axle, two winch support cross braces, a winch mount beam, left and right lateral braces for winch mount beam, and the winch) are of lesser length and may be grouped and bundled into a package of about 60 pounds made readily acceptable in terms of length and girth. This is illustrated in FIG. 11. The needed small hardware may be placed in this package, or in the rail section package, or with some in each package. Items such as connector brackets for uniting ends of rail sections together may also be in this package or in the rail section package.

Figure 12:
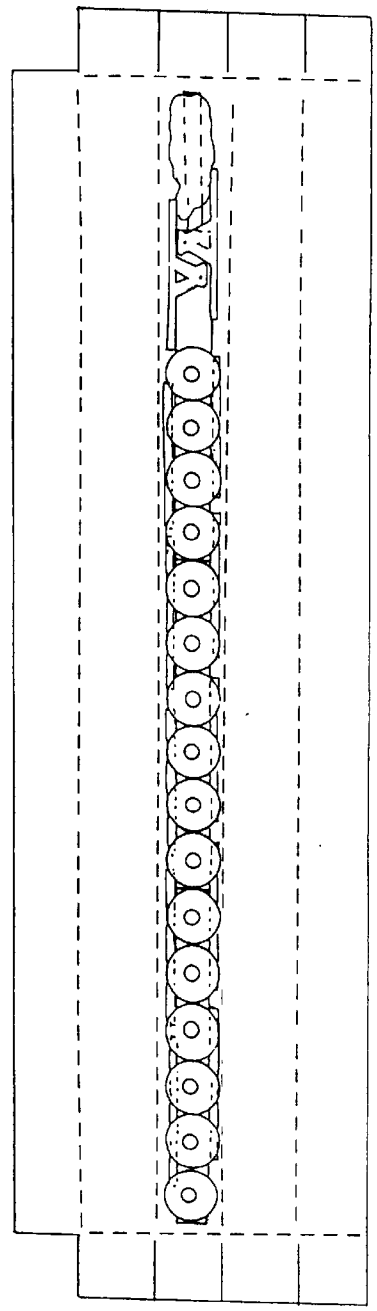
FIG. 12 is a schematic top plan view of components for an intermediate section of ramp that can be interposed between the water end section and the shore end section to get greater length; the components are illustrated in an open corrugated shipment box.

Sometimes a boat ramp according to the invention will need one or more extra sections of side rails (e.g., 103 inches in length) to provide the length for accepting a longer boat (or for moving a boat over a swamp area to higher ground). In such instances, two side rails of 103 inches in length, two connector brackets, three cross support beams, additional hull roller assemblies (e.g., eight such assemblies in unassembled form) will be needed as well as small hardware. The components for eight hull roller assemblies are eight hull roller axles, 16 hull rollers, and eight brackets for the mounting of the complete hull roller assembly on the side rails. All of this can total around 60 pounds and can be conveniently placed in a single elongated package, with compact arrangement as illustrated in FIG. 12. Such a package is well within the limits of weight, length, and girth for parcel shipment packages.

As aforenoted, one of the best metals for most components of the new ramp (other than the hull rollers and keel roller) is aluminum. It is relatively light in weight and can be shaped to provide the necessary strength while at the same time reducing in many instances the quantity of metal to achieve the necessary strength. Other metals such as magnesium are also strong and light in weight. Even galvanized steel may be used in smaller dimensions to achieve needed strength. Various other materials may be developed that will satisfy special requirements for parts such as strength, weight, non-scratch, etc. Material for all components should be resistant to corrosion.

Figure 13:
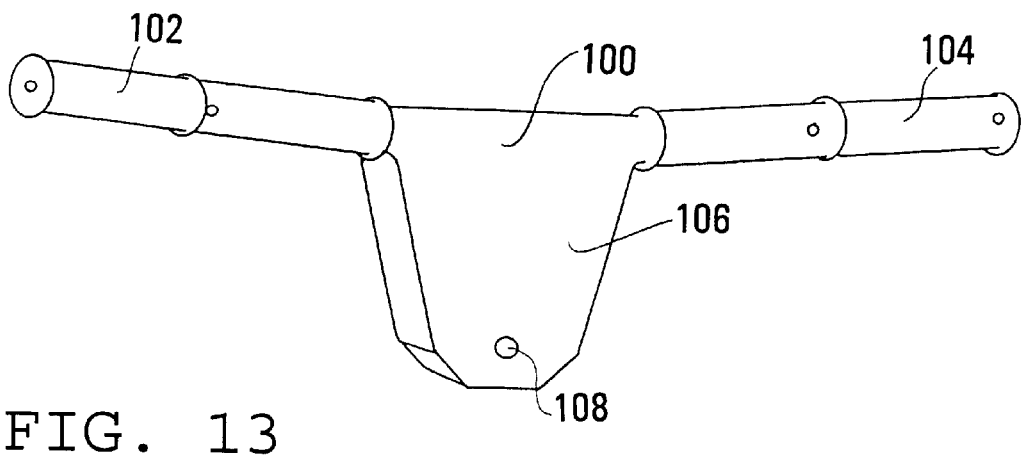
FIG. 13 is a schematic perspective view of an alternate axle and elevational brace for a hull roller assembly.

An optional design for a hull roller axle and elevational bracing for it is illustrated in FIG. 13. The showing illustrates a composite axle 100 where the outermost arms 102 and 104 of it are in a slight angular relationship of about 5 degrees. This may be desirable as an assistance to place the outer axial width of hull rollers in better orientation to rotate in flush condition against a contoured boat hull. The illustration includes an elevational brace or body 106 that spaces the axle 100 from the location of pivot 108.

Figure 14:
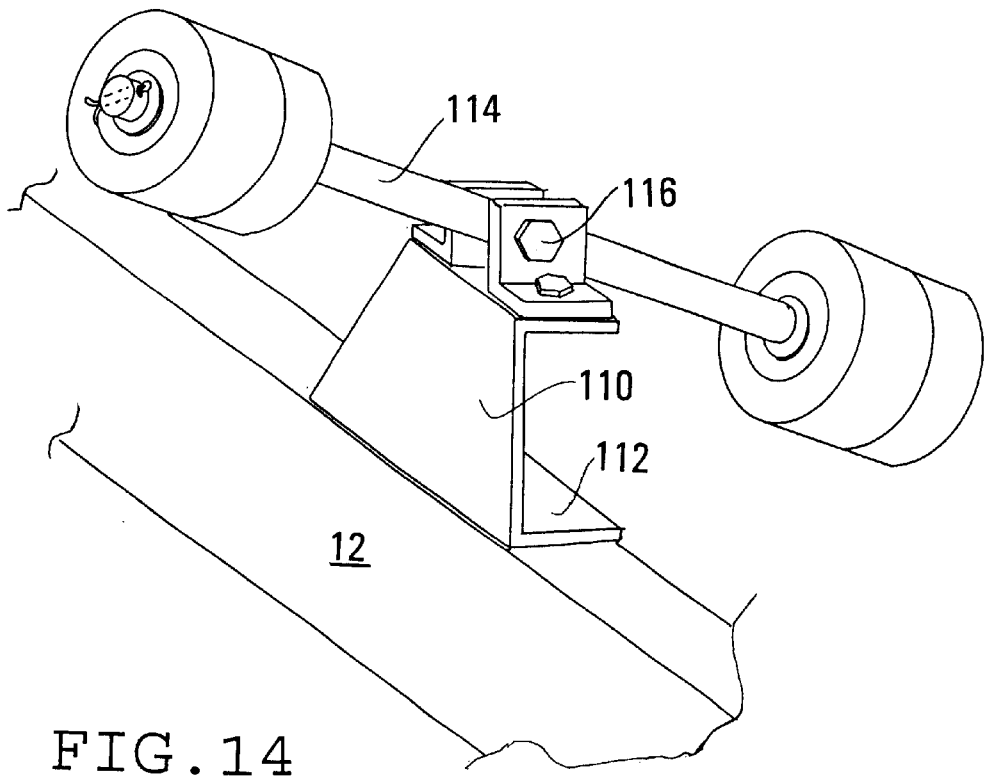
FIG. 14 is a schematic perspective view of a further alternative hull roller assembly.

An optional design for an entire hull roller assembly (see FIG. 14) has the brace 110 for elevation built into and integrated with the bracket base 112. Base 112 is mounted on a rail 12. The axle 114 either has a hole through it (or has an ear on it with a hole through the ear) for acceptance of a shaft 116 on which the axle is pivotable.

The downwardly directed flanges 26 and 28 of the cross support beam 16 as mounted to the side rails 12, 14 have an added function. They are capable of penetrating into earth sufficiently to provide a solid anchoring of the ramp against slippage.

Those skilled in the art may recognize that this invention can be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are intended to be embraced thereby.

That which is claimed is:

1. A boat ramp comprising:
   (i) a ladder-style frame having elongated lateral side rails held in spaced apart parallel condition by cross support beams, said spaced apart condition being greater than about one and one-half feet, said rails having a length greater than 10 feet and terminating at one end as a water end and terminating at the other end as a shore end,
   (ii) at least six hull roller assemblies mounted on said side rails in laterally paired relationship across from each other and in longitudinally spaced relationship along said rails such that at least three said hull roller assemblies are distributed over the water end half of the length of each said rail, each said assembly having a hull roller axle carrying at each end thereof a hull roller, said hull roller assemblies being so mounted on said rails that their said axles are in pivotable elevated transverse orientation above said rails so as to permit said hull rollers to pivot and rotate according to the contour of the hull of a boat pulled into resting condition thereupon, each said side rail having a said hull roller assembly at the water end terminus thereof, the hull rollers across from each other that are nearest to each other being called inside hull rollers,
   (iii) a water end keel roller assembly on a water end cross support beam mounted to and extending between said rails at said water end, said keel assembly having a central keel roller greater in axial length than one-fourth of the distance between said rails, said axial length of said keel roller being at least about 6 inches, said inside hull rollers of said hull roller assemblies at said water end being in such proximity to said keel roller as to cooperate with said keel roller at said water end to substantially preclude all contact by the bow of a boat against structural elements of said ramp at said water end other than said hull rollers and said keel roller, and
   (iv) a shore end winch assembly comprising a winch mount beam mounted between said rails at a location inwardly spaced from said shore end, said winch mount beam being sloped upward toward said shore end at a low angle of no more than about 45 degrees above the elongated direction of said rails, a winch mounted at the outer end of said winch mount beam, and lateral bracing for said winch mount beam.

2. The ramp of claim 1 wherein said side rails are C shaped and have a web wall connection between a top flange and a bottom flange, and wherein said cross support beams are likewise of a C shape and are fastened at their web wall to the bottom flange of said side rails.

3. The ramp of claim 2 wherein said hull roller assemblies are mounted on the top flange of said side rails.

4. The ramp of claim 1 wherein the axle of said hull roller assemblies at the water end terminus of said side rails has an axial length shorter than the axial length of all other said roller assemblies.

5. The ramp of claim 1 additionally including a winch support cross brace between said rails at the shore end terminus of said rails, and another winch support cross brace between said rails at a location spaced inwardly from the shore end terminus of said rails, and wherein said mounting of said winch mount beam between said rails is on said inwardly spaced cross brace.

6. The ramp of claim 5 wherein said winch support cross brace at said location inward from said shore end terminus of said rails has a diamond cross-sectional shape with the corners oriented in compass directions, and wherein said winch mount beam is fastened flush against a surface of said cross brace so as to slope toward said shore end at said angular relationship.

7. The ramp of claim 5 wherein said lateral bracing for said winch mount beam includes a brace extending at an angle from each side of a midpoint between the ends of said winch mount beam to a location on said ramp proximate to the shore end terminus of the rails, the relationship between the length of said winch mount beam and the distance of said inwardly spaced cross beam from the shore end terminus of said rails being such as to place said winch approximately perpendicularly upward from the shore end terminus of said rails.

8. A portable boat ramp made of components conveniently assembled by a customer-user from an unassembled compactly packaged condition, comprising:
   (i) a ladder-style frame comprised of elongated side rails of cross-sectional C shape having a side web wall connecting the upper and lower flanges of the C shape, cross support beams likewise of said C shape for removable mounting to the lower flange of said rails to hold said rails in spaced apart parallel condition, each said elongated side rail comprising two elongated side rail sections of no more than 9 feet in length capable of being united in end-to-end relationship to form an elongated side rail having a length greater than 10 feet and terminating at one end as a water end and terminating at the other end as a shore end, (ii) a plurality of hull roller assemblies, each said assembly comprising a bracket for mounting on a side rail of said ladder-style frame, a hull roller axle for mounting by said bracket in a pivotable elevated transverse orientation above a side rail of said ladder-style frame, and two hull rollers for mounting on said axle so that one hull roller is at each end of said axle, (iii) a water end keel assembly comprised of a water end cross member, a keel roller bracket having bracket ends, a keel roller axle for mounting between said bracket ends, and a keel roller for mounting on said axle, said keel roller having an axial length greater than 6 inches and a diameter at its axial ends that exceeds the size of said bracket ends, and (iv) a shore end winch assembly comprised of a first winch support cross brace for removable fastening as a cross beam between said rails at the shore end terminus of said rails, and a second winch support cross brace for removable fastening as a cross beam between said rails at a location spaced inwardly from the shore end terminus of said rails, a winch mount beam having a foundation end for removable fastening to said second cross brace in a manner causing said winch mount beam to extend toward said shore end at approximately a 45 degree angle with respect to the elongated direction of said rails, said winch mount beam having a winch support plate at its upper end opposite said foundation end, a winch for removable mounting on said winch support plate, and lateral bracing for removable mounting to said winch mount beam, said lateral bracing including a lateral brace for each side of said winch mount beam and designed to extend at an angle from a midpoint between the ends of said winch mount beam to an end of said first winch support cross brace.

9. Two packages containing compactly packaged unassembled components for convenient assembly by a customer-user to form a boat ramp, each said package weighing less than 70 pounds, (a) the first of said packages being a long package not over 108 inches in length and not over 130 inches in length plus girth, and containing unassembled components for a ladder-style frame comprised of elongated side rails of cross-sectional C shape having a side web wall connecting the upper and lower flanges of the C shape, and a plurality of cross support beams likewise of said C shape for removable mounting to the lower flange of said rails so as to hold said rails in spaced apart parallel condition, each said elongated side rail comprising two elongated side rail sections of no more than 9 feet in length capable of being united in end-to-end relationship to form an elongated side rail having a length greater than 10 feet and terminating at one end as a water end and terminating at the other end as a shore end, (b) the second of said packages being no greater in length than 72 inches and no greater in length plus girth than 130 inches, and containing unassembled components for each of the following:

(i) a plurality of hull roller assemblies, each said assembly comprising a bracket for mounting on a side rail of said ladder-style frame, a hull roller axle for mounting by said bracket in a pivotable elevated transverse orientation above a side rail of said ladder-style frame, and two hull rollers for mounting on said axle so that one hull roller is at each end of said axle, (ii) a water end keel assembly comprised of a water end cross member, a keel roller bracket having bracket ends, a keel roller axle for mounting between said bracket ends, and a keel roller for mounting on said axle, said keel roller having an axial length greater than 6 inches and a diameter at its axial ends that exceeds the size of said bracket ends, and (iii) a shore end winch assembly comprised of a first winch support cross brace for removable fastening as a cross beam between said rails at the shore end terminus of said rails, and a second winch support cross brace for removable fastening as a cross beam between said rails at a location spaced inwardly from the shore end terminus of said rails, a winch mount beam having a foundation end for removable fastening to said second cross brace in a manner causing said winch mount beam to extend toward said shore end at approximately a 45 degree angle with respect to the elongated direction of said rails, said winch mount beam having a winch support plate at its upper end opposite said foundation end, a winch for removable mounting on said winch support plate, and lateral bracing for removable mounting to said winch mount beam, said lateral bracing including a lateral brace for each side of said winch mount beam and designed to extend at an angle from a midpoint between the ends of said winch mount beam to an end of said first winch support cross brace, and (c) connector brackets for uniting two elongated rail sections in end-to-end relationship, plus small hardware items for fastening and holding aforesaid components in assembled condition as a boat ramp, all or a portion of said connector brackets and small hardware items being in one or the other of the aforesaid packages, or distributed between the aforesaid packages.

10. A third package added to the two packages that satisfy the requirements of claim 9, said third package comprising unassembled components for a rail section to extend the total length of said ramp, said third package being a long package not over 108 inches in length and not over 130 inches in length plus girth, and containing two elongated side rails of no more than 9 feet in length, two connector brackets for uniting rail sections, three cross support beams, eight hull roller axles, 16 hull rollers, eight brackets for mounting hull roller assemblies, and small hardware.

\* \* \* \* \*